Patented Sept. 28, 1948

2,450,079

UNITED STATES PATENT OFFICE 2,450,079

WAXY POLYOL ETHER-ESTERS

Kenneth R. Brown, West Chester, Pa., assignor to Atlas Powder Company, Wilmington, Del., a corporation of Delaware No Drawing. Application April 23, 1943,
Serial No. 484,317

4 Claims. (Cl. 260—410.6)

The present invention relates to new waxy compositions and their preparation.

An object of the invention is the preparation of new, tough, waxy, polyol ether-ester compositions which find useful application in the arts.

Another object of the invention is the preparation of water-scourable waxy materials.

A further object of the invention is the preparation of hydrocarbon soluble waxy materials.

Still another object of the invention is the preparation of waxy materials which are solid at room temperature but which may be readily melted.

A still further object of the invention is the simple and inexpensive preparation of waxy, long-chain esters from heat-sensitive starting materials.

Compositions produced according to this invention are tough, long fibered, waxy materials. They have good light and chemical stability. In general, they show, to a very desirable extent, qualities of cohesiveness, lubricity, plasticity, and lack of brittleness. They will usually be found to have good solubility in hydrocarbon solvents at relatively low temperatures so that they may be easily applied from a hydrocarbon solution to work on which they are used. Ordinarily, they are readily dispersible in warm water with the aid of common dispersing agents. This last property makes for ready preparation of emulsions from which they may be applied. The same property also makes them easily scourable and removable from materials.

According to the present invention, products of the above type are prepared by reacting a mixture of a polyol and water with an olefine oxide and esterifying the reaction product with a long chain, saturated, aliphatic, monobasic acid.

Polyols which may be used are those of relatively low carbon content which contain at least 3 hydroxyl groups. By the term polyols, as used in this specification, are meant polyhydric alcohols and carbohydrates. Since the use of polyols of high carbon content per molecule tends to result in end products which are not sufficiently waxy and plastic, it is preferred to use polyols having not more than 12 carbon atoms per molecule. As exemplary of polyols which may be employed may be listed glycerol and the higher polyhydric alcohols, the cyclitols such as inositols, and partially alkylated cyclitols such as quebrachitol and pinitol, diglycerol and the lower polyglycerols, pentaerythritol, di-pentaerythritol and other pentaerythritol ethers, hexitans, such as sorbitan and mannitan, saccharides such as glucose, fructose, lower alkyl glucosides, sucrose, lactose, trehalose, glucosan, and mannosan, and lactones such as gluconic lactone. Polyols containing up to 6 carbon atoms in particular have yielded valuable products. Examples of such are glycerol, diglycerol, pentaerythritol, hexitans, such as sorbitan and mannitan, hexitols, such as sorbitol, mannitol, commercial sorbitol syrup, and hexoses, such as glucose. Mixtures of polyols, such as partially reduced sugars, also may be employed.

In the production of the compositions of the present invention, the polyol is mixed with a substantial proportion of water, and the mixture is reacted with an olefine oxide. While the present invention is not to be considered as limited to any particular theory of reaction, experimental evidence indicates that the polyol, water, and olefine oxide react chemically during the olefine oxide treatment forming a complex reaction product. It is this complex product which is thereafter esterified to produce the tough, waxy composition of the present invention. The proportion of water employed may be varied over a considerable range. For example, as little as 0.08 mol of water per mol of hydroxyl in the polyol may be used with advantage. Excellent products may be produced with higher proportions of water, however. For example, water may be included in proportion as high as 1.5 mols per mol of hydroxyl in the polyol. The product increases somewhat in brittleness as the water content increases. For applications requiring more plastic waxy materials, molal proportions of water of not much more than about 1.25 mols per mol of hydroxyl in the polyol will often be found preferable. It is usually found that more heat-sensitive materials, such as glucose and other sugars, produce better products if proportions of water higher than those necessary with more rugged material are employed.

The olefine oxide is preferably added directly to the polyol-water mixture. The olefine oxide employed should be of low molecular weight. If the olefine oxide is of too high molecular weight, products of a sufficiently high titer cannot be obtained. It has been found that most satisfactory products are obtained with olefine oxides containing 3 carbon atoms or less, as ethylene oxide and propylene oxide, although it is to be understood that the use of low molecular weight olefine oxides such as butylene oxide and amylene oxide is within the scope of the present invention.

The amount of olefine oxide may be varied considerably depending upon the properties of wax desired and the type and amount of acid which is to be used. The olefine oxide gives valuable properties of toughness and long-fibered character to the final product and to obtain these properties to the extent usually desired, the molal quantity of olefine oxide generally should be not less than about 0.4 mol per mol of total hydroxyl in the water and polyol, and also not less than about 1.5 mols per mol of water employed. Larger proportions of olefine oxide increase the toughness and long fibered character of the waxy composition. However, if too much olefine oxide is employed the titer of the waxy material produced is undesirably lowered. It is ordinarily best not to use so much olefine oxide that a titer below about 30° C. is obtained. For example, using one mol of the polyol, sorbitol, a mol ratio of water to hydroxyl in the polyol of 0.08, the olefine oxide ethylene oxide, and stearic acid in proportion sufficient to esterify substantially completely, the ethylene oxide should not be present in proportion above about 20 mols if the titer is to be above 30° C. It is to be understood that the upper limit of olefine oxide which may be employed in the production of waxy compositions having a titer of about 30° C. and above will vary depending upon the particular ingredients and their proportions. Thus in the foregoing example, if the proportion of stearic acid is reduced, the maximum number of mols of ethylene oxide which may be used to yield a wax with a titer above 30° C. is also reduced. Propylene oxide derivatives, mol for mol, as compared with ethylene oxide derivatives give lower titers, and it is usually found that about 3 times as much ethylene oxide may be employed as propylene oxide, in the production of waxy compositions of high titer.

The olefine oxide may conveniently be added to polyol-water mixture in a pressure vessel with stirring. It may be added in gaseous or liquid form. Temperatures between 80° and 140° C. and elevated pressures will be found to assist the speed of reaction considerably. With the more heat-sensitive materials, as sugars, better color and less decomposition is often obtained the lower the temperature at which the olefine oxide is reacted. Usually, the addition of olefine oxide is carried out in the presence of a catalyst. Many acid or basic catalysts are operative. A few examples of such are boric acid, sodium oleate, sodium methylate, di-sodium phosphate and sodium di-hydrogen phosphate. With sugars boric acid has been noted to give particularly good results.

Acids employed for esterification should be straight chain, aliphatic, saturated, monobasic acids containing at least 16 carbon atoms, and such acids should, in general, be employed in molal quantities equivalent to at least about one-half the molal proportion of hydroxyl in the polyol plus one-half the molal proportion of water employed. The preferred acid is the 18-carbon acid, stearic acid. It is readily available and gives desirable properties to the waxy material produced, but the 16-carbon acid, palmitic acid, and acids of longer carbon chain length may also be used. Pure distilled acid may be used, or technical mixtures such as the so-called double and triple pressed stearic acids which are rich in stearic and palmitic acids, and contain only very minor amounts of lower saturated or 18-carbon unsaturated acids, or the product from the substantially complete hydrogenation of oleic acid, may be employed. Likewise, hydrogenated fish oil and soya acids, monobasic acids from paraffin oxidation or other known sources of saturated fatty acids may be employed. The type of acid used should depend to some extent on the product desired, in that, to keep the titer up to the desired value of 30° C., the softening effect of a high molal quantity of olefine oxide should be counter-balanced by use of the inherently higher melting stearic or longer chain acid. Conversely, with less olefine oxide, more palmitic, or other softer acid can be tolerated.

Ordinarily substantially stoichiometric amounts of acid are used, in the interest of good hydrocarbon solubility, and proper titer. However, to improve emulsifiability, the acid ratio may be dropped somewhat, but the molal equivalents of acid used for the esterification should always be at least equal to the above-mentioned value of about one-half the hydroxyl equivalents in the original polyol plus one-half the mol equivalents of water to obtain desired waxy character.

Esterification of the polyol-water-olefine oxide reaction product may be carried out by direct esterification methods, with agitation in closed reaction vessels and removal of water as by distillation. A catalyst is ordinarily necessary for the reaction, but often the same catalyst used for the addition of olefine oxide, which has remained in the reaction mixture will serve this function. However, fresh catalyst, of any suitable type, may be added for the esterification, if desired.

Temperatures ranging from about 280° C. down to as low as about 150° C. may conveniently be used. Too high temperatures may produce an undesirably dark product. With sugars, particularly, it is usually advantageous to keep the reaction temperature as low as possible at least at the start, and if necessary to increase it only gradually, in the interest of color. Using more rugged polyols, higher temperature schedules may be employed, to give short reaction times without sacrificing product quality.

If the product, after esterification, is undesirably dark, it may be decolorized by a convenient procedure, such as treatment with decolorizing carbons, or activated earths, or by chemical means, such as treatment with hydrogen peroxide, benzoyl peroxide, or the like. Suitable combinations of such treatments may likewise be employed.

It may at times be desirable to react a part of the acid with the polyol prior to reaction with olefine oxide. Usually no more than 50% of acid should be so prereacted. Pre-esterification is usually more applicable with polyols sufficiently rugged to permit high temperature esterification, but partial esters having up to 50% of their hydroxyl content in esterified form and prepared by other suitable methods will sometimes be found usable.

If sufficient long chain ester is present to produce desired waxiness and titer, other types of acid may also be employed in the product in amount up to that sufficient to fill out the stoichiometric quantity for complete esterification. Such acids as lower aliphatic acids, unsaturated acids, branched chain acids, aromatic acids, polybasic acids, and inorganic acids may be employed if they do not detract from the desired properties of the product.

A minor proportion of the olefine oxide may be reacted with some of either the polyol or the water prior to the reaction of all three together.

Numerous other modifications may also be made without departing from the present invention. For example, various substituent groups may be employed on the polyol, the olefine oxide, or the acid. It is only necessary that such substituents do not deleteriously affect formation of the desired waxy materials. A few such substituent groups which may at times be employed are alkyl, acyl, ether, aryl and even inorganic groups.

Examples of preparations according to this invention follow:

Example 1

This example teaches the preparation of a waxy material with the polyol, sorbitol. 134 pounds of an aqueous solution of sorbitol containing about 5% water were placed in an autoclave with 225 g. of sodium methylate catalyst and heated to 90° C. 200 pounds of ethylene oxide were added over a period of 2 to 4 hours. The reaction was carried out at 90° C. and 110–120 lbs. pressure until, finally, the pressure dropped to zero and the reaction was complete.

455 pounds of this product were then reacted with 1690 pounds of double pressed stearic acid for 5 hours at 270° C. in an inert atmosphere with agitation. During the last hour of reaction, 2% decolorizing carbon, (Darco G-60) was added and the product was then cooled to 100° C. and filtered.

The product so formed had a titer of 43.7° C. and a cloud point in 60% Stoddard solvent solution of 28° C.

Example 2

This example shows the use of a higher proportion of water, the polyol being technical sorbitol solution prepared by the electrolytic reduction of glucose. 134 pounds of an aqueous solution of sorbitol containing about 15% water were placed in an autoclave and heated to 90° C. 200 pounds of ethylene oxide were added in increments and the reaction was continued at 90° C. and 110 lbs. pressure until the pressure had dropped to zero. No catalyst was added, the inorganic ash of the syrup, sodium sulfate, being sufficient to catalyze the reaction.

455 pounds of this product and 1690 pounds of hydrogenated soya oil fatty acids were then reacted at 260° C. for 5 hours in an atmosphere of carbon dioxide. 2% decolorizing carbon (Darco G-60) was added to improve color during the last hour of reaction and the product was then filtered after partial cooling. The wax so formed had a titer of 44.8° C. and a cloud point of 29.8° C. in 60% Stoddard solvent solution.

Example 3

In this example the polyol, glycerol, was employed. 92 parts of glycerine, U. S. P. containing 5% $H_2O$ and 132 parts of ethylene oxide were reacted together in an autoclave in the presence of 0.2 part of sodium methylate catalyst. The reaction was carried out at 100° C. and 110 pounds pressure. Completion of the reaction was noted by the reduction of the pressure to zero.

The glycerol-ethylene oxide reaction product was then esterified, 158 parts being reacted with 569 parts of commercial double pressed stearic acid at 260° C. for 4 hours. No esterification catalyst was added, the catalyst present in the glycerol-ethylene oxide product sufficing. 2% decolorizing carbon (Darco G-60) was added for the last half hour of reacting time. The ester was then cooled and filtered. The resulting wax had a titer of 39.9° C. and a cloud point of 29° C. in 60% Stoddard solvent solution.

Example 4

This example shows the use of the olefine oxide, propylene oxide. 182 g. of a sorbitol solution containing between 5 and 6% water was placed in an autoclave along with 0.3 g. of sodium methylate catalyst and heated to 100° C. 174 g. of propylene oxide were added at a pressure of 100 lbs. per square inch. The reaction was continued at 100° C. until the pressure dropped to zero, indicating its completion.

106 g. of the product produced were then reacted with 520 g. of hydrogenated soya oil fatty acids at 160° C. for 4 hours. No catalyst was needed, the catalyst serving for the propylene oxide addition being sufficient for purposes of esterification. The product of this reaction had a titer of 42.3° C.

Example 5

This example teaches the preparation of a waxy material using the polyol, glucose. 120 parts of glucose were dissolved in 60 parts of water, and 1½ parts of a boric acid catalyst were added to the solution. Solution and catalyst were heated to approximately 115° C. in an autoclave and 264 parts of ethylene oxide were added gradually at a rate such that the pressure in the autoclave was kept below 100 lbs. per square inch.

After all the ethylene oxide had been added, the reaction temperature was maintained until all the ethylene oxide had reacted as indicated by the dropping of the pressure in the system to zero. To 1 part of this ethylene oxide preparation were added 3.3 parts of commercial stearic acid. The charge was heated in a reaction vessel to 180° C. in an atmosphere of carbon dioxide with agitation and held at this temperature from 3 to 5 hours, during the last hour of which 2% activated carbon, (Darco G-60) was added to improve color. A slight coloring developed in the product and decolorizing carbon was added to improve the color. After the reaction, the charge was cooled to approximately 100° C. in an atmosphere of carbon dioxide and filtered.

The filtered product may be decolorized further if desired by heating to 100–120° C. with 1% of a 30% hydrogen peroxide solution for one-half hour to one hour. If desired, the inorganic acidity may be neutralized with a neutralizing agent such as sodium carbonate, calcium carbonate, calcium hydroxide, or the like either during the treatment with decolorizing carbon, or after the bleaching treatment with hydrogen peroxide.

The product obtained according to this example had a titer of 46.5° C. and a cloud point of 34° C. in a 60% solution in Stoddard solvent (a hydrocarbon solvent).

The products of this invention have a wide range of usefulness. They are useful waxes and lubricants for many purposes. They are much less brittle than the corresponding esters of the un-modified polyols. They may be used as waxes in cosmetic preparations, yarn sizes, lubricants, polishes, wax-base finishing and protective compositions and in many other arts where their physical properties are advantageous.

What is claimed is:

1. A process which comprises: (1) reacting a solution of a saturated polyol and water with an olefin oxide, said polyol containing at least three hydroxyl groups, from three to six carbon atoms per molecule, and only carbon, hydrogen, and oxygen, said water being present in the proportion of from 0.08 to 1.5 mols per mol of hydroxyl radical in said polyol, said olefin oxide being selected from the group consisting of ethylene oxide, propylene oxide, and mixed ethylene and propylene oxides and being employed in a molal quantity of at least 0.4 times the total molal quantity of hydroxyl in the polyol plus water and of at least 1.5 times the molal quantity of water, and said reaction being conducted between about 80° and about 140° C. in the presence of an etherification catalyst; and (2) esterifying the reaction product with an aliphatic, straight chain, saturated, mono-basic acid containing at least 16 carbon atoms, said acid being employed in a molal quantity at least equal to one-half the molal quantity of water plus one-half the molal quantity of hydroxyl in the polyol, and said esterification conducted between about 150° C. and about 280° C. in the presence of an esterification catalyst; and the amount of olefin oxide being employed in an amount small enough that a final product having a titer of at least about 30° C. is obtained.

2. A process according to claim 1 in which said polyol is sorbitol and said olefin oxide is ethylene oxide.

3. A process according to claim 1 in which said polyol is mannitol and said olefin oxide is ethylene oxide.

4. A process according to claim 1 in which the polyol is glucose and said olefin oxide is ethylene oxide.

KENNETH R. BROWN.

REFERENCES CITED

The following references are of record in the file of this patent:

UNITED STATES PATENTS

| Number | Name | Date |
|---|---|---|
| 1,959,930 | Schmidt | May 22, 1934 |
| 1,970,578 | Schoeller | Aug. 21, 1934 |
| 2,174,760 | Schuette | Oct. 3, 1939 |
| 2,233,382 | De Groote | Feb. 25, 1941 |